United States Patent [19]

Petri

[11] Patent Number: 5,089,595

[45] Date of Patent: Feb. 18, 1992

[54] FLAME-PROOF POLYCARBONATE CONTAINING UNITS DERIVING FROM HALOGENATED MACROCYCLIC COMPOUNDS

[75] Inventor: Alberto Petri, Milan, Italy

[73] Assignee: Enichem Tecnoresine S.p.A., Palermo, Italy

[21] Appl. No.: 573,875

[22] Filed: Aug. 28, 1990

Related U.S. Application Data

[62] Division of Ser. No. 371,513, Jun. 26, 1989, Pat. No. 4,987,269.

[30] Foreign Application Priority Data

Jul. 8, 1988 [IT] Italy ............................... 21284 A/88

[51] Int. Cl.⁵ .............................................. C08G 64/04
[52] U.S. Cl. .................................... 528/204; 528/196; 528/202
[58] Field of Search ..................... 528/204, 202, 196

[56] References Cited

U.S. PATENT DOCUMENTS 4,987,269 1/1991 Petri ................................ 528/196

Primary Examiner—Harold D. Anderson
Attorney, Agent, or Firm—Hedman, Gibson & Costigan

[57] ABSTRACT

Thermoplastic, branched, high-molecular-weight polycarbonates endowed with flame-proof properties (self-extinguishing properties) are characterized in that they contain in their macromolecule carbonate units, units deriving from a di-hydroxy-aromatic compound having the formula:

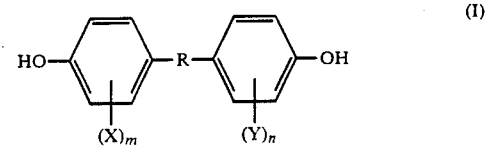

wherein:
  R is a single bond; or
  R is a linear or branched, either substituted or non-substitued, alkylene radical of from 1 to 5 carbon atoms; or
  R is selected from the group consisting of O, S, $SO_2$, CO;
  X, Y which may be either equal to, or different from, each other, are either H or $CH_3$;
  m, n which may be either equal to, or different from, each other, are integers comprised within the range of from 1 to 4;

and units deriving from a halogenated macrocyclic compound having the formula

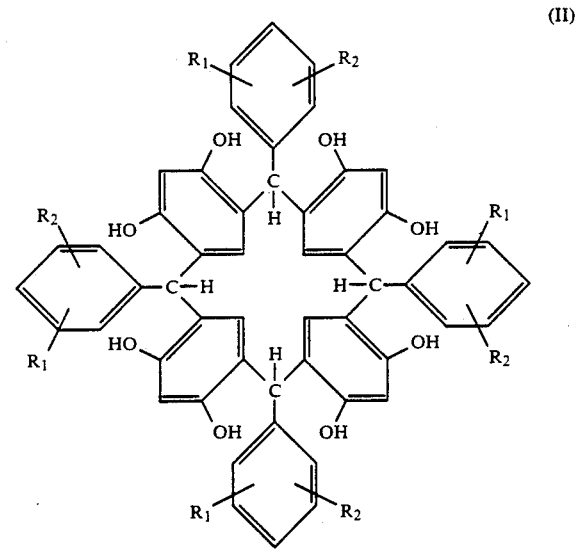

wherein:
  $R_1$ is H or OH or chlorine or bromine, and
  $R_2$ is chlorine or bromine.

5 Claims, No Drawings

FLAME-PROOF POLYCARBONATE CONTAINING UNITS DERIVING FROM HALOGENATED MACROCYCLIC COMPOUNDS

This is a divisional of application Ser. No.: 07/371,513 filed June 26, 1989, now U.S. Pat. No. 4,987,269.

The present invention relates to thermoplastic, branched, high-molecular-weight polycarbonates endowed with flame-proof properties.

The polycarbonates are renown in the art thanks to their excellent physical and mechanical properties such as, e.g., their high impact strength and their considerably high dimensional and thermal stability.

Owing to the more and more increasing need of having available materials which, due to safety reasons, are also endowed, besides excellent mechanical properties, with flame-proof properties, in the art several methods have been developed in oder to endow polycarbonates with self-extinguishing properties.

One among the most commonly used methods is based on the introduction of halogens, mainly bromine and chlorine, into the polycarbonate.

The halogens can be introduced into the polymer as additives, with generally polyhalogenated organic substances being used, such as disclosed, e.g., in U.S. Pat. No. 3,357,942, together, if desired, with further additives showing a synergistic action, such as, e.g., antimony oxide (J. T. Howarth et al. Plastic World, March 973, pages 64-74).

Binding halogens to the polymeric chain by using difunctional phenols, such as, e.g., tetrabromobisphenol-A and tetrachloro-bisphenol-A, as comonomers in the preparation of the same polycarbonate, is known (U.S. Pat. No. 3,334,154).

The halogenated substances known from the prior art, whether they are additives, or monomers to be incorporated into the polymeric chain, have anyway to be used in rather considerable amounts, in order to be capable of endowing the polycarbonate with the desired self-extinguishing properties.

If on one hand the presence of considerable amounts of halogens in the polycarbonates endows the same polymer with flame-proof characteristics, on the other hand it causes a degradation of the polycarbonate during the processing steps, thus causing a decay of the physical and mechanical characteristics typical of non-halogenated polycarbonate.

Furthermore, the high temperatures required for the processing of the polycarbonate may cause the degradation of the halogenated compounds, and the development of hydrogen halide acids, with consequent damaging of the machinery by corrosion.

Therefore, the unsolved problem in the art consists in obtaining polycarbonates endowed with flame-proof properties, which maintain unchanged all of their typical chemical, physical and mechanical properties.

The present Applicant has found now that such a problem can be solved, and thermoplastic, branched, high-molecular-weight polycarbonates endowed with flame-proof properties can be obtained by means of the copolymerization with a halogenated macrocyclic compound used in small amounts, anyway smaller than those amounts which cause undesirable changes to occur in polymer properties.

More particularly, according to the present invention said polycarbonates are characterized in that they contain in their macromolecule carbonate units, units deriving from a di-hydroxy-aromatic compound having the formula:

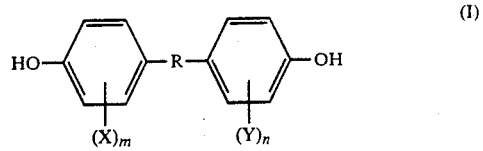

wherein:
R is a single bond; or
R is a linear or branched, either substituted or non-substituted, alkylene radical of from 1 to 5 carbon atoms; or
R is selected from the group consisting of O, S, $SO_2$, CO;
X, Y which may be either equal to, or different from, each other, are either H or $CH_3$;
m, n which may be either equal to, or different from, each other, are integers comprised within the range of from 1 to 4;

and units deriving from a halogenated macrocyclic compound having the formula:

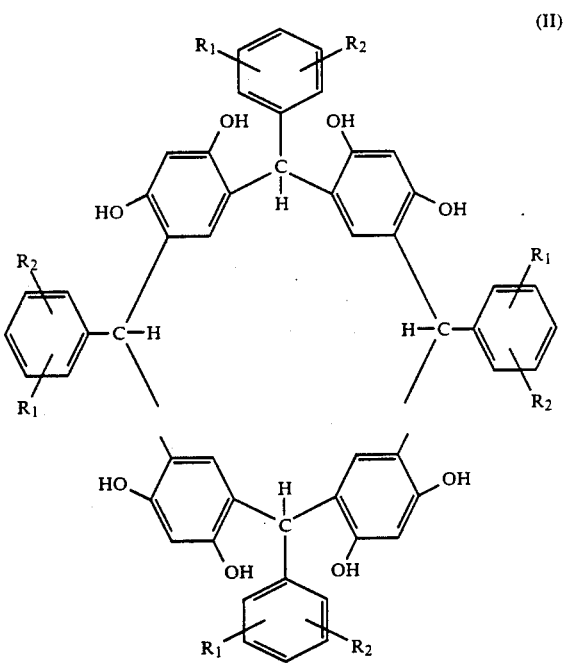

wherein:
$R_1$ is hydrogen or OH or chlorine or bromine, and
$R_2$ is chlorine or bromine.

In order that said polycarbonates may show flame-proof properties, it is enough that in their macromolecule they contain from 0.05 to 5 units, and preferably from 0.05 to 2 units, deriving from (II) per each 100 units deriving from (I).

Some examples of dihydroxy-aromatic compounds (I) which can be used are the following:
4,4'-dihydroxy-diphenyl;
2,2-bis-(4-hydroxyphenyl)-propane (bisphenol-A);
2,2-bis-(3,5-dimethyl-4-hydroxyphenyl)-propane;
bis-(4-hydroxyphenyl)-methane.

The polycarbonates according to the present invention can also contain units deriving from compounds containing one single aromatic, divalent ring, such as, e.g., resorcinol and hydroquinone.

The halogenated macrocyclic compounds complying with formula (II) are novel compounds and can be prepared by means of the condensation of resorcinol with a derivative of benzaldehyde having the formula:

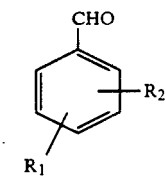 (III)

wherein:
$R_1$ is hydrogen or OH or Cl or Br;
$R_2$ is either Cl or Br.

The reaction is catalysed by acids, and generally a mixture is used of sulfuric acid and acetic acid, which acts both as a catalyst and as the solvent.

The molar ratio of resorcinol to (III) should be of at least 1:1. and preferably an excess of resorcinol relatively to said ratio is used.

The temperature at which the reaction is carried out is of the order of 5°–10° C., and from 4 to 40 hours are necessary in order that the reaction may proceed up to completeness. The macrocyclic compound is finally recovered by precipitation in water.

Some examples of halogenated macrocyclic compounds suitable for the purposes of the present invention are:

2,4-dihydroxy-benzylidene-diphe
  nyl-{4$^I$-chloro-2$^{II}$,4$^{II}$-dihydroxy-5$^{II}$
  -benzylidenediphenyl-[4$^{III}$-chloro-2$^{IV}$,4$^{IV}$-dihydroxy-
  5$^{IV}$-benzylidenediphenyl-(4$^V$-chloro-2$^{VI}$,4$^{VI}$-dihydroxy-5,5$^{VI}$-(4$^{VII}$-chloro)-benzylidene)]};

2,4-dihydroxy-benzylidenediphenyl-{3$^I$,4
  $^I$-dichloro-2$^{II}$,4$^{II}$-dihydroxy-5$^{II}$-benzylidenediphe
  nyl-[3$^{III}$,4$^{III}$-dichloro-2$^{IV}$,4$^{IV}$-dihydroxy-5$^{IV}$-benzylidenediphenyl-(3$^V$,4$^V$-dichloro-2$^{VI}$,4$^{VI}$-dihydroxy-5,5$^{VI}$-(3$^{VII}$,4$^{VII}$-dichloro)-benzylidene)]};

2,4-dihydroxy-benzylidenediphenyl-{2$^I$
  -hydroxy-5$^I$-bromo-2$^{II}$,4$^{II}$-di
  hydroxy-5$^{II}$-benzylidenediphenyl-[2$^{III}$-hydroxy-5$^{III}$-bromo-2$^{IV}$,4$^{IV}$-dihydroxy-benzylidenediphenyl-(2$^V$-hydroxy-5$^V$-bromo-2$^{VI}$,4$^{VI}$-dihydroxy-5,5$^{VI}$-(2$^{VII}$-hydroxy-5$^{VII}$-bromo)-benzylidene)]}.

The flame-proof polycarbonates according to the present invention can be prepared according to one of the methods of polycondensation reported in the prior art.

For example, according to the interface polycondensation method, the dihydroxy-aromatic compound (I) is dissolved in an aqueous solution of sodium hydroxide, and to such a solution an organic solvent immiscible with water, e.g., methylene chloride, is added, which contains the halogenated, polyhydroxy, macrocyclic compound (II).

Through the so obtained mixture phosgene gas is bubbled and the reaction is maintained at a temperature comprised within the range of from 15° to 25° C. for a time of from 20 minutes up to 6 hours, in the presence of a molecular weight regulator, for example a monofunctional phenol, and of a phase-transfer catalyst, such as, e.g., a tertiary amine.

The so obtained polycarbonate is isolated by washing the organic phase according to known techniques, and subsequently distilling off the solvent, or by means of a precipitation with a non-solvent.

According to a preferred form of practical embodiment of the invention, the interface polycondensation reaction is carried out by using, in place of phosgene, chloroformyl-terminated polycarbonate oligomers (having a molecular weight generally comprised within the range of from 400 to 2000), obtained by means of the interface reaction between phosgene and a dihydroxy-aromatic compound.

A further possible route in order to obtain the polycarbonates according to the present invention consists in the well-known methodology of solution polycondensation. In this case, phosgene is bubbled through a solution of methylene chloride and pyridine which contains the dihydroxy-aromatic compound (I), the halogenated macrocyclic compound (II), and a monofunctional phenol as a molecular weight regulator.

Said polycarbonates can be obtained as well by transesterification in the molten state, by reacting the dihydroxy-aromatic compound and the halogenated macrocyclic compound with diaryl-, dialkyl- or alkylaryl-carbonates, at a temperature comprised within the range of from 100° to 300° C., in the presence of transesterification catalysts.

The polycarbonates obtained by means of any of the above disclosed methods have a molecular weight comprised within the range of from 20,000 to 30,000; they maintain unchanged all of the typical characteristics of the thermoplastic materials, and are suitable for being processed both by injection-moulding and by extrusion and/or blow-moulding.

Said polycarbonates result to be classifiable as V-0 in fire behaviour test carried out according to UL 94 Standard (Underwriters' Laboratories, Inc. Bulletin S4) on specimens of 3.2 mm of the thickness, obtained by means of press-moulding or injection moulding.

According to said Standard, the materials receive a rating of V-0, V-1, V-2 on the basis of the results obtained with five specimens, according to the following criterion:

V-0: None of the five specimens should show a combution time longer than 10 seconds after the flame of a Bunsen burner is removed. The total combustion time for all of said five specimens (10 ignitions) should not exceed 50 seconds. None of the specimens should let burning particles drip which ignite the surgical cotton placed along the vertical under the specimen at the distance of 305 mm.

V-1: None of the specimens should show a combustion time longer than 30 seconds after the flame of a Bunsen burner is removed. The total combustion time for all of said five specimens (10 ignitions) should not exceed 250 seconds. None of the specimens should let burning particles drip which ignite the surgical cotton positioned along the vertical under the specimen, at the distance of 305 mm.

V-2: None of the specimens should show a combustion time longer than 30 seconds after the flame of a Bunsen burner is removed. The total combustion time for all of said five specimens (10 ignitions) should not exceed 250 seconds. The specimens may burning particles drip which ignite the surgical cotton positioned along the vertical under the specimen, at the distance of 305 mm.

Furthermore, all of said five specimens should pass the test according to UL-94 Standard, otherwyses they receive their rating on the basis of the behaviour of the worst specimen. For instance, if a specimen shows a V-2 behaviour, and the other four specimens show a V-0 behaviour, all of the five specimens receive a rating of V-2. Finall, should a specimen continue to burn for more than 30 seconds after the removal of the flame of a Bunsen burner, it shall not be classified according to UL 94 Standard, but will be reported as a "burning specimen".

Furthermore, the specimens are submitted to the fire behaviour test according to ASTM D 2863-77 Standard, which correlates the flammability of a polymeric material with the concentration of oxygen contained in the atmosphere under which the same specimen is. This correlation is expressed by means of the LOI (Limiting Oxygen Index), i.e., as the minimum oxygen percentage capable of maintaining the combustion of the specimen in an oxygen-nitrogen atmosphere which impinges against the same specimen by flowing from down upwards.

On the polycarbonates according to the present invention, the following further characterizations were carried out:

Inherent Viscosity ($\eta$)

This property is determined in methylene chloride at 20° C. by means of the Ubbelhode viscometer and is expressed as dl/g.

Melt Flow Index (MFI)

The evaluation of the melt flow index is carried out on the "melt indexer" on the granulate extruded under a load of 1.2 kg and at the temperature of 300° C., according to ASTM D 1238 Standard.

Impact Test (IZOD)

The Izod impact test is evaluated on specimens with notch at 0° C. according to ASTM D 256 Standard.

Shear Sensitivity (SS)

The evaluation of this characteristic is carried out on the "melt indexer" on the granulate extruded under loads of 1.2 and 12 kg, at the temperature of 300° C. according to the ASTM D 1238 Standard.

The following experimental tests are reported for illustrative purposes and should not be intended as being limitative of the purview of the same invention.

EXAMPLE 1

Preparation of 2,4-dihydroxy-benzylidenediphenyl-{$4^I$-chloro-$2^{II}$, $4^{II}$-dihydroxy-$5^{II}$-benzylidenediphenyl-[$4^{III}$-chloro-$2^{IV}$, $4^{IV}$-dihydroxy-$5^{IV}$-benzylidenediphenyl-($4^V$-chloro-$2^{VI}$,$4^{VI}$-dihydroxy-$5,5^{VI}$-($4^{VII}$-chloro)-benzylidene)]}["A" Compound); in formula (II): $R_1$ is Cl in 4-position of the aromatic ring: $R_2$ is hydrogen].

A solution of acetic acid (80 ml) containing 52.8 g (0.48 mol) of resorcinol and 28.1 ml (0.2 mol) of p-chloro-benzaldehyde is charged to a glass reactor of 500 ml of capacity, equipped with thermometer, mechanical stirrer and cooling jacket.

Into the solution, kept under an inert atmosphere of nitrogen and at the controlled temperature of 7° C., 60 ml of a mixture consisting of sulfuric acid/acetic acid in the ratio of 1:2 by volume is added dropwise over a time of 30 minutes.

After 24 hours of reaction, the product is recovered by precipitation in 3.8 liters of water, filtration, washing with portions of water of 1.5 liters each (until the wash liquors reach a neutral pH value), and drying in oven under vacuum, at the temperature of 120° C., for a time of 4 hours.

The so obtained raw reaction product is then crystallized in 2.3 liters of acetone by means of solubilization at the boiling temperature of said solvent, high-temperature filtration and slow reprecipitation at the temperature of 0° C.

After filtration, washing with acetone and drying for 3 hours under vacuum at 80° C., 33.6 g of product ("A" compound), equivalent to a yield of 72.2%, is obtained.

The product was characterized as follows:
Molecular weight (VPO): 916 (theoretical value=930)
Melting point (DSC): 406° C.

| Elemental analysis | C | H | Cl |
|---|---|---|---|
| Theoretical values, %: | 67.1 | 3.9 | 15.3 |
| Found values, %: | 66.9 | 4.0 | 14.9 |

The structure was confirmed by N.M.R. spectroscopic analysis.

EXAMPLE 2

2,4-dihydroxy-benzylidenediphenyl-{$3^I,4^I$-dichloro-$2^{II},4^{II}$-dihydroxy-$5^{II}$-benzylidenediphenyl-[$3^{III},4^{III}$-dichloro-$2^{IV},4^{IV}$-dihydroxy-$5^{IV}$-benzylidenediphenyl-($3^V,4^V$-dichloro-$2^{VI},4^{VI}$-dihydroxy-$5,5^{VI}$-($3^{VII},4^{VII}$-dichloro)-benzylidene)]}["B" Compound); in formula (II): $R_1$ is Cl in 4-position of the aromatic ring; $R_2$ is Cl in 3-position of the aromatic ring].

The process is carried out by operating according to the same modalities as of Example 1, with 3,4-dichlorobenzaldehyde being used in place of p-chlorobenzaldehyde.

27 g of "B" compound, equivalent to a yield of 50.6%, is obtained.

The product was characterized as follows:
Melting point (DSC): 416.5° C.
Molecular weight (VPO): 1100 (theoretical value=1068)

| Elemental analysis | C | H | Cl |
|---|---|---|---|
| Theoretical values, %: | 58.4 | 3 | 25.9 |
| Found values, %: | 58.4 | 3.2 | 26.6 |

The structure was confirmed by N.M.R. spectroscopic analysis.

EXAMPLE 3

Preparation of: 2,4-dihydroxy-benzylidenediphenyl-{$2^I$-hydroxy-$5^I$-bromo-$2^{II},4^{II}$-dihydroxy-$5^{II}$-benzylidenediphenyl-[$2^{III}$-hydroxy-$5^{III}$-bromo-$2^{IV},4^{IV}$-dihydroxybenzylidenediphenyl-($2^V$-hydroxy-$5^V$-bromo-$2^{VI},4^{VI}$-dihydroxy-$5,5^{VI}$-($2^{VII}$-hydroxy-$5^{VII}$-bromo)-benzylidene)]}; ["C" Compound); in formula (II): $R_1$ is OH in 2-position of the aromatic ring; $R_2$ is Br in 5-position of the aromatic ring].

A solution of acetic acid (205 ml) containing 19.8 g (0.18 mol) of resorcinol and 30.2 g (0.15 mol) of 2-hydroxy-5-bromo-benzoic aldehyde is charged to a glass reactor of 500 ml of capacity, equipped with mechanical stirrer and thermometer, and dipped in a temperature-controlled bath.

Into the solution, kept under an inert atmosphere of nitrogen and at the controlled temperature of 40° C., 45 ml of a mixture consisting of sulfuric acid/acetic acid in the ratio of 1:2 by volume is added dropwise over a time of 30 minutes.

After 5 hours, the reaction mixture is precipitated in 4.5 liters of water. The precipitate is recovered by centrifugation, is washed three times, each time with a portion of water of 1.5 liters (until the wash liquors reach a neutral pH value), and is then dried in oven under vacuum, at the temperature of 120° C., for a time of 4 hours.

The so obtained raw reaction product is then crystallized in 250 ml of pyridine by means of solubilization at the boiling temperature of said solvent, high-temperature filtration and low-temperature precipitation.

After filtration, washing with cold pyridine, subsequent washes with ethyl ether in order to remove pyridine, and vacuum drying for 4 hours at 120° C., 34.3 g of product (the "C" compound) is obtained, with a yield of 78.1%.

The product was characterized as follows:

| Elemental analysis | C | H | Br |
| --- | --- | --- | --- |
| Theoretical values, %: | 53.2 | 3.1 | 27.3 |
| Found values, %: | 52.9 | 3.1 | 27.1 |

The structure was confirmed by N.M.R. spectroscopic analysis.

EXAMPLE 4

84 g of bisphenol-A, 1.37 g of "A" compound (equivalent to 0.40% by mol relatively to bisphenol-A), 65.2 g of sodium hydroxide dissolved in 650 ml of water, 20 mg of sodium dithionite (as a reducing agent in order to prevent coloured byproducts from forming) and 6.3 ml of an 0.5N aqueous solution of triethylamine are charged under a nitrogen stream to a glass reactor of 3 liters of capacity, kept at the controlled temperature of 25° C.

Then 1.7 g of p-tert.-butylphenol dissolved in 1,300 ml of methylene chloride is added, and 44 g of phosgene gas is bubbled over 30 minutes through the mixture with vigorous stirring.

The reaction is continued for 2 hours; at the end, aqueous sodium hydroxide (at 20% by weight) is added in order to maintain the pH at a value higher than 11.

At the end, the reaction mixture is diluted with 500 ml of methylene chloride and the organic phase is separated and subsequently washed with 300 ml of water (twice), 800 ml of 0.1N hydrochloric acid and, finally, with portions of 600 ml of water, until wash liquors are neutral.

The polymer is recovered by means of the distillation of the organic solvent; the recovered polymer is dried and ground until a powder is obtained.

The so obtained polycarbonate is then extruded at the temperature of 260° C., and the extrudate is then cooled and granulated.

The granules are moulded both by press-moulding (280° C., 50 kg/cm$^2$) and by injection moulding (300° C.), in order to obtain specimens of dimensions of 127 mm×6.5 mm×3.2 mm.

Five specimens were submitted to fire behaviour test according to UL 94 Standard. They result to belong to V-0 class, according to the data reported in Table 1.

The other characteristics of the polycarbonate are reported in Table 2.

EXAMPLE 5

Example 4 is repeated with the same operating modalities and amounts of reactants, with the exception that 1.5 g of "B" compound is used (0.38% by mol relatively to bisphenol-A) in place of "A" compound.

The so obtained polycarbonate results to be V-0, according to UL 94 Standard; the data relevant to the tests carried out is reported in Table 1.

The other characteristics of the polymer are reported in Table 2.

EXAMPLE 6

Example 4 is repeated with the same operating modalities and amounts of reactants, with the exception that no halogenated macrocyclic compounds are used.

The so obtained polycarbonate results to be V-2, according to UL 94 Standard (see Table 1).

The other characteristics of the polymer are reported in Table 2.

EXAMPLE 7

253.8 g of chloroformyl-terminated polycarbonate oligomers (number average molecular weight=681, chloroformyl end groups=2,758 meq/kg, hydroxy end groups=180 meq/kg), prepared from bisphenol-A and phosgene and dissolved in 900 ml of methylene chloride, is charged under a nitrogen blanketing atmosphere to a glass reactor if 2.5 liters of capacity, kept at the controlled temperature of 25° C.

50 ml of water containing 3.0 g of "A" compound (equivalent to 0.27% by mol relatively to bisphenol-A), 5.3 g of p-tert.-butyl-phenol, 5.0 of sodium hydroxide, 31 mg of sodium dithionite and 7 ml of a 0.05N aqueous solution of triethylamine is added in the cited order to the above solution kept stirred with a double-anchor stirring device running at 300 rpm.

40 minutes later 350 ml of water containing 64.4 g of bisphenol-A and 20.5 g of sodium hydroxide, and then 115 ml of an aqueuos solution of sodium hydroxide at 20% by weight are added over a 10-minutes time, by using a metering pump.

After 140 minutes, the mixture is poured into 3000 ml of methylene chloride; the organic phase is then separated and washed, in the order, with 450 ml of water (twice), 1300 ml of 0.15N aqueous sodium hydroxide (3 times), 900 ml of water (twice), 1300 ml of 0.1N aqueous hydrochloric acid and, finally, with portions of water of 900 ml each, until wash liquors are neutral.

The polymer is recovered by distillation of the organic solvent, is dried and ground until a powder is obtained.

The so obtained polycarbonate is then extruded at the temperature of 260° C., and the extrudate is finally cooled and granulated.

The granules are injection-moulded or press-moulded, in order to obtain specimens of dimensions of (127×6.5×3.2) mm.

Five specimens are submitted to the fire behaviour test according to UL 94 Standard, and result to belong to V-0 class, according to the data reported in Table 1.

The other characteristics of the polycarbonate are reported in Table 2.

EXAMPLE 8

Example 7 is repeated with the same operating modalities and with the same amounts of reactants, with the exception that 4.4 g of "A" compound is added (0.41% by mol relatively to bisphenol-A).

The polycarbonate obtained results to be V-0 at the fire behaviour test according to UL 94 Standard (see Table 1).

The other characteristics of the polymer are reported in Table 2.

EXAMPLE 9

Example 7 is repeated with the same operating modalities and amounts of reactants, with the exception that 5.1 g of "B" compound is added (0.41% by mol relatively to bisphenol-A) in place of "A" compound.

The polycarbonate obtained results to be V-0 at the fire behaviour test, evaluated according to UL 94 Standard (see Table 1).

The other characteristics of the polymer are reported in Table 2.

EXAMPLE 10

Example 7 is repeated with the same operating modalities and amounts of reactants, with the exception that no halogenated macrocyclic compounds are used.

The polycarbonate obtained results to be V-2 at fire behaviour test, evaluated according to UL 94 Standard (see Table 1).

The other characteristics of the polymer are reported in Table 2.

TABLE 1

| Example | Total combustion time of 5 specimens (10 ignitions) (seconds) | Total combustion time per specimen (2 ignitions) (seconds) | UL-94 classification |
|---|---|---|---|
| 4 | 37 | 8 | V-0 |
| 5 | 42 | 9 | V-0 |
| 6 | 122 | 29 | V-2 |
| 7 | 39 | 10 | V-0 |
| 8 | 26 | 8 | V-0 |
| 9 | 38 | 9 | V-0 |
| 10 | 142 | 25 | V-2 |

TABLE 2

| Example | $[\eta]$ 20° C. $CH_2Cl_2$ (dl/g) | LOI % | Impact strength (IZOD) (J/m) | MFI (300° C., 1.2 kg) | SS (300° C.; 1.2 and 12 kg) |
|---|---|---|---|---|---|
| 4 | 0.587 | 34 | 762 | 4.1 | 19.7 |
| 5 | 0.590 | 32 | 743 | 3.9 | 20.0 |
| 6 | 0.520 | 26 | 732 | 7.6 | 13.7 |
| 7 | 0.578 | 33 | 767 | 4.0 | 20.0 |
| 8 | 0.599 | 35 | 790 | 3.1 | 21.8 |
| 9 | 0.569 | 36 | 800 | 4.2 | 19.8 |
| 10 | 0.516 | 26 | 778 | 8.6 | 13.2 |

I claim:

1. A thermoplastic, branched high-molecular-weight polycarbonate having flame-proof properties comprising units from a di-hydroxy-aromatic compound having the formula:

$$HO-\bigodot(X)_m-R-\bigodot(Y)_n-OH \qquad (I)$$

wherein:
R is a single bond; or
R is a linear or branched, either substituted or non-substituted, alkylene radical of from 1 to 5 carbon atoms; or
R is selected from the group consisting of O, S, $SO_2$, CO;
X,Y which are either equal to, or different from, each other, are either H or $CH_3$;
m,n which are either equal to, or different from, each other, are integers comprised within the range of from 1 to 4;
and units from a halogenated macrocylic compound having the formula:

(II) [structural formula of macrocyclic compound with $R_1$, $R_2$ substituents]

wherein:
$R_1$ is hydrogen or OH or chlorine or bromine, and
$R_2$ is chlorine or bromine.

2. A polycarbonate according to claim 1, comprising from 0.05 to 5 units from (II) per each 100 units from (I).

3. A polycarbonate according to claim 2, comprising from 0.05 to 2 units from (II) per each 100 units from (I).

4. A polycarbonate according to claim 1, wherein the dihydroxy-aromatic compound (I) is selected from among:
4,4'-dihydroxy-diphenyl;
2,2-bis-(4-hydroxyphenyl)-propane;
2,2-bis-(3,5-dimethyl-4-hydroxyphenyl)-propane; and
bis-(4-hydroxyphenyl)-methane.

5. A polycarbonate according to claim 1, wherein the halogenated, poly-hydroxy macrocylic compound (II) is selected from among:
2,4-dihydroxy-benzylidenediphenyl-($4^I$-chloro-$2^{II},4^{II}$-dihydroxy-$5^{II}$-benzylidenediphenyl-($4^{III}$-chloro-$2^{IV}$,-$4^{IV}$-dihydroxy-$5^{IV}$-benzylidene-diphenyl-($4^V$-chloro-$2^{VI},4^{VI}$-dihydroxy-$5,5^{VI}$-($4^{VII}$-chloro)-benzylidene)));
2,4-dihydroxy-benzylidenediphenyl -($3^I,4^I$-dichloro-$2^{II},4^{II}$-dihydroxy-5 $^{II}$-benzylidenediphenyl-($3^{III},4^{III}$-dichloro-$2^{IV},4^{IV}$-dihydroxy-$5^{IV}$-benzylidenediphenyl-($3^V,4^V$-dichloro-$2^{VI},4^{VI}$-dihydroxy-$5,5^{VI}$-($3^{VII},4^{VII}$-dichloro)-benzylidene))); and
2,4-dihydroxy-benzylidenediphenyl-($2^I$-hydroxy-$5^I$-bromo-$2^{II},4^{II}$-dihydroxy-$5^{II}$-benzylidene diphenyl-($2^{III}$-hydroxy-$5^{III}$-bromo-$2^{IV},4^{IV}$-dihydroxy-benzylidenediphenyl-($2^V$-hydroxy-$5^V$-bromo-$2^{VI},4^{VI}$-dihydroxy-$5,5^{VI}$-($2^{VII}$-hydroxy-$5^{VII}$-bromo)-benzylidene))).

* * * * *